United States Patent
Nada

(10) Patent No.: US 10,518,654 B2
(45) Date of Patent: Dec. 31, 2019

(54) TRUCK AND METHOD OF CONTROLLING ELECTRIC DRIVE MOTOR FOR DRIVING MOUNTED ON TRUCK

(71) Applicant: TOYOTA JIDOSHA KABUSHIKI KAISHA, Toyota-shi, Aichi-ken (JP)

(72) Inventor: Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/017,132

(22) Filed: Jun. 25, 2018

(65) Prior Publication Data

US 2019/0001840 A1    Jan. 3, 2019

(30) Foreign Application Priority Data

Jun. 28, 2017 (JP) ................ 2017-126005

(51) Int. Cl.
*B60L 15/20* (2006.01)
*B60W 10/08* (2006.01)
*B60W 10/28* (2006.01)
*B60W 30/18* (2012.01)

(52) U.S. Cl.
CPC ........ *B60L 15/2081* (2013.01); *B60W 10/08* (2013.01); *B60W 10/28* (2013.01); *B60W 30/18009* (2013.01); *B60L 2200/36* (2013.01); *B60L 2210/30* (2013.01); *B60L 2240/12* (2013.01); *B60L 2240/423* (2013.01); *B60L 2250/26* (2013.01)

(58) Field of Classification Search
CPC .................................................. B60L 15/2081
USPC ................................................... 318/432, 34
See application file for complete search history.

(56) References Cited

U.S. PATENT DOCUMENTS

| 4,639,653 | A  | * | 1/1987  | Anderson | ............ G05B 19/253 |
|           |    |   |         |          | 318/568.1 |
| 8,354,813 | B2 | * | 1/2013  | Hasegawa | ............... H02P 29/68 |
|           |    |   |         |          | 318/432 |
| 8,600,594 | B2 | * | 12/2013 | Aoki     | ...................... B60K 6/445 |
|           |    |   |         |          | 701/22 |
| 2012/0150384 | A1 |  | 6/2012 | Jung et al. | |

FOREIGN PATENT DOCUMENTS

JP    2014-166053    9/2014

* cited by examiner

*Primary Examiner* — David Luo
(74) *Attorney, Agent, or Firm* — Finnegan, Henderson, Farabow, Garrett & Dunner, LLP

(57) ABSTRACT

When a stepping amount of an accelerator pedal is 0%, torque Ta is generated with the rotating speed being zero. When retreat is occurred in the slope start, the rotating speed is reduced. When the rotating speed is reduced, the torque is increased. Thus, the retreating force finally matches the propulsion force. As a result, the retreat becomes uniform motion. The decision of torque in such a manner does not require a value of a vehicle weight.

12 Claims, 5 Drawing Sheets

TRUCK AND METHOD OF CONTROLLING ELECTRIC DRIVE MOTOR FOR DRIVING MOUNTED ON TRUCK

CROSS-REFERENCE TO RELATED APPLICATIONS

This application claims priority to Japanese Patent Application No. 2017-126005, filed Jun. 28, 2017, the disclosure of which is incorporated by reference herein in its entirety.

BACKGROUND

The present disclosure relates to an electric motor-driven truck.

A driver of a vehicle changes step from a brake pedal to an accelerator pedal when starting the vehicle on a slope. JP2014-166053A discloses a technique that in order to prevent an electric motor-driven vehicle from descending and retreating on a slope during the changing step, torque is generated in accordance with the gradient amount of the slope.

The retreating force acting in a retreating direction on an uphill is influenced by not only the gradient amount of the slope but also a vehicle weight. However, the disclosure in the prior art document does not mention the vehicle weight. It is considered that this is because the disclosure in the above technique is based on the assumption that the vehicle weight is nearly constant. When general passenger vehicles are targeted, a problem would not be raised even based on such assumption because the variation width of a vehicle weight is not large.

However, in the case of trucks, the variation width of a vehicle weight is considerably larger than the case of passenger vehicles due to a loaded freight amount. Thus, when the above-described assumption is adopted, the excess or shortage of torque may occur. Measuring or estimating a vehicle weight and considering a vehicle weight, it is possible to use the method in the above technique. However, such measurement or estimation requires time and effort or complicated arithmetic operation. Thus, it is preferable to avoid such measurement or estimation.

Therefore, there is need facilitating an electric motor-driven truck to start on a slope by an easy method.

SUMMARY

A first aspect provides a truck. The truck of the first aspect includes an electric drive motor for driving; and a control unit configured to control the electric drive motor to generate, when retreat is occurred in slope start, torque in an opposite direction from torque acting on the electric drive motor due to gradient of the slope, the toque having an absolute value same as an absolute value of the torque acting due to the gradient of the slope. In such an aspect, the retreat becomes uniform motion, which enables a driver to perform driving operation calmly and facilitates slope start. Furthermore, a value of a vehicle weight is unnecessary to decide torque in the above-described manner, and thus it is easily achieved.

A second aspect provides a truck. The truck of the second aspect includes a drive motor for driving; and a control unit configured to control the electric drive motor, when retreat is occurred in slope start, so that propulsion force generated by the electric drive motor matches retreating force generated due to the gradient of the slope. In such an aspect, it is possible to obtain the same effects as the first aspect.

A third aspect provides a truck. The truck of the third aspect includes an electric drive motor for driving; and a control unit that controls the electric drive motor, when retreat is occurred in slope start, so that the retreat becomes uniform motion. In such an aspect, it is possible to obtain the same effects as the first aspect.

In the first to third aspects, when the retreat is occurred, an absolute value of the rotating speed of the electric drive motor increases monotonically as an absolute value of a speed increases by the retreat; and the control unit may increase torque generated by the electric drive motor as the rotating speed is reduced from zero. In such an aspect, the retreat may become uniform motion without using a value of a speed.

In the first to third aspect, the control unit may perform control, when the torque is increased as the rotating speed is reduced from zero, so that the torque increment is proportional to variation of the rotating speed. In such an aspect, the control is easier than PI control and the like, and hunting hardly occurs.

DESCRIPTION OF EMBODIMENTS

Figure 1:
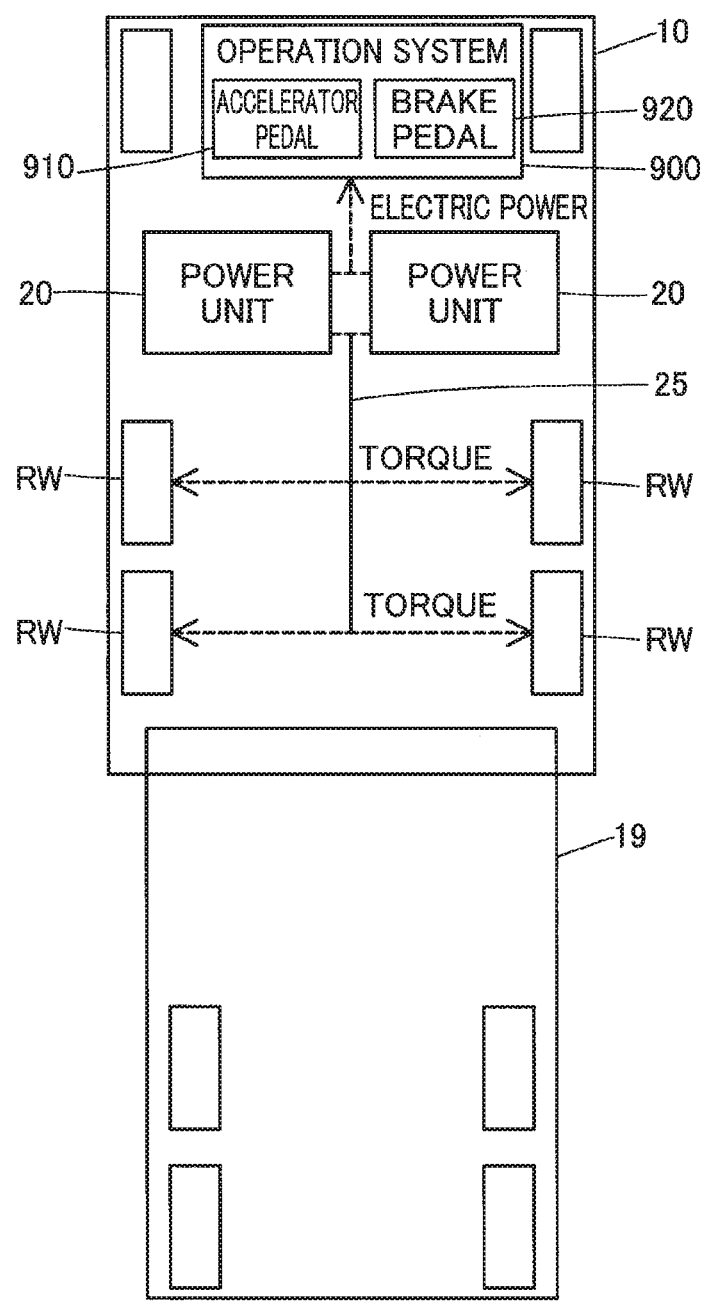
FIG. 1 is a schematic view of a truck.

FIG. 1 illustrates a truck 10. The truck 10 pulls a trailer 19. The truck 10 includes two power units 20, a propeller shaft 25, and an operation system 900. The power units 20 have a function implementing generation of electric power by a fuel cell, as described later.

The operation system 900 is a generic term of devices operated by a driver for driving. The operation system 900 includes an accelerator pedal 910, a brake pedal 920, a steering wheel (not illustrated), and the like. Each of two power units 20 supplies electric power to the operation system 900. The torque generated by two power units 20 is transmitted to four rear wheels RW through one propeller shaft 25.

Figure 2:
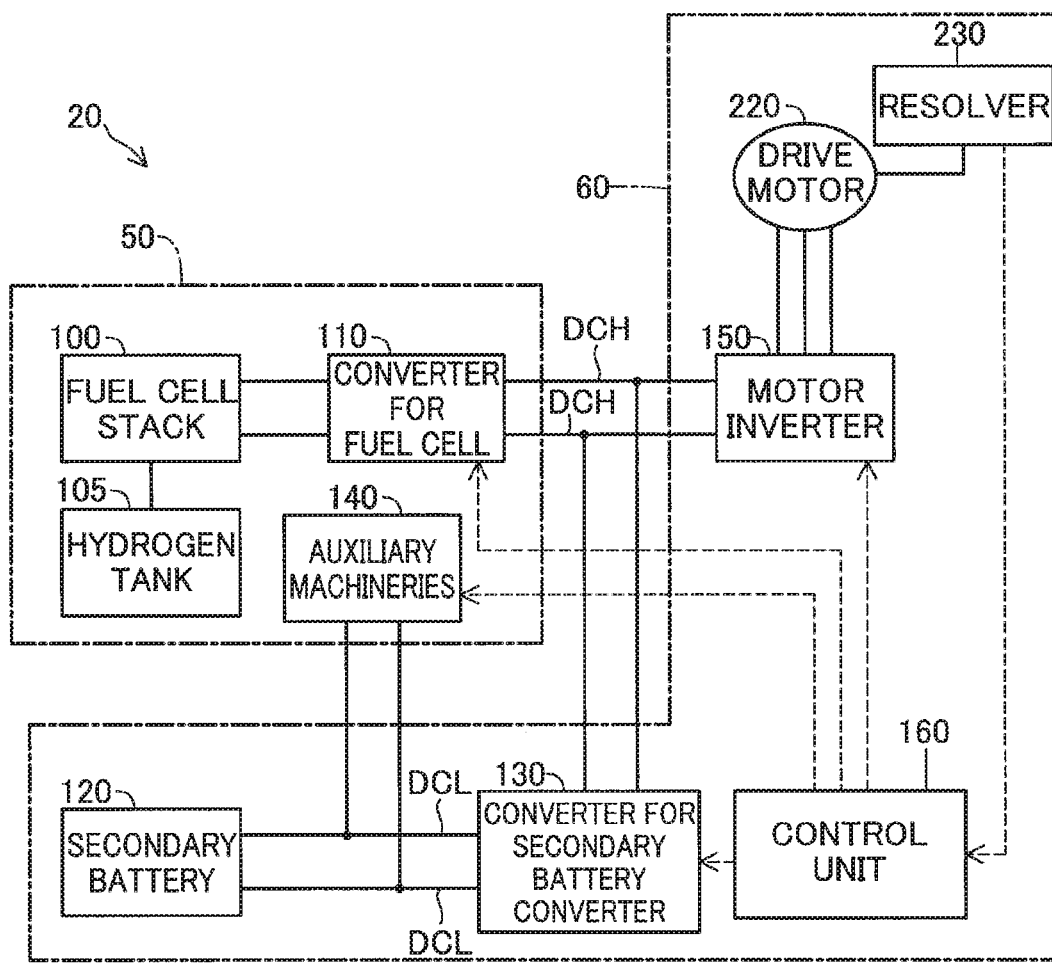
FIG. 2 is a block configuration diagram of a power unit.

FIG. 2 is a block configuration diagram of the power unit 20. The power unit 20 includes a fuel cell module 50 and an electric system 60. The fuel cell module 50 includes a fuel cell stack 100, a hydrogen tank 105, a converter for the fuel cell 110, and auxiliary machines 140. The electric system 60 includes a secondary battery 120, a converter for the secondary battery 130, a motor inverter 150, a control unit 160, an electric drive motor 220, and a resolver 230.

The hydrogen tank 105 stores hydrogen for supply to the fuel cell stack 100. The fuel cell stack 100 is connected electrically to the converter for the fuel cell 110. The converter for the fuel cell 110 performs boosting operation for increasing an output voltage of the fuel cell stack 100 to a target voltage. The converter for the fuel cell 110 is connected electrically to the motor inverter 150 through high-pressure DC wiring DCH.

The secondary battery 120 is a lithium titanate secondary battery. The secondary battery 120 is connected electrically to the converter for the secondary battery 130 through low-pressure DC wiring DCL. The secondary battery 120 has a structure in which a plurality of cells are stacked in series.

The converter for the secondary battery 130 is connected electrically to the converter for the fuel cell 110 and the motor inverter 150 through high-pressure DC wiring DCH. The converter for the secondary battery 130 adjusts a voltage in the high-pressure DC wiring DCH that is an input voltage to the motor inverter 150, and controls charge and discharge of the secondary battery 120.

The converter for the secondary battery 130 discharges the secondary battery 120 when the output electric power from the converter for the fuel cell 110 is smaller than target output electric power.

When regenerative electric power is generated by the electric drive motor 220, the converter for the secondary battery 130 converts the regenerative electric power from AC to DC and outputs the regenerative electric power to the low-pressure DC wiring DCL side.

The converter for the secondary battery 130 is able to convert output electric power of the fuel cell stack 100 and output electric power to the low-pressure DC wiring DCL side. Using the converted electric power, the control unit 160 is able to perform control of increasing SOC of the secondary battery 120 when the electric power outputtable from the converter for the fuel cell 110 exceeds the target output electric power.

The auxiliary machines 140 is a generic term of auxiliary machines used for operation of the fuel cell stack 100. The auxiliary machines 140 include an air compressor, a hydrogen circulation pump, a water pump, and the like. The auxiliary machines 140 are connected electrically to the low-pressure DC wiring DCL or the high-pressure DC wiring DCH.

The motor inverter 150 converts DC power supplied through the high-pressure DC wiring DCH into three-phase AC power. The motor inverter 150 is connected electrically to the electric drive motor 220 and supplies three-phase AC power to the electric drive motor 220. The motor inverter 150 converts regenerative electric power generated in the electric drive motor 220 into DC power and outputs it to the high-pressure DC wiring DCH.

The resolver 230 detects a rotation angle of a rotor in the electric drive motor 220 and inputs the detection result to the control unit 160.

The control unit 160 includes a plurality of ECUs. The control unit 160 controls operation of each part of the power unit 20, including the above-described contents.

Figure 3:
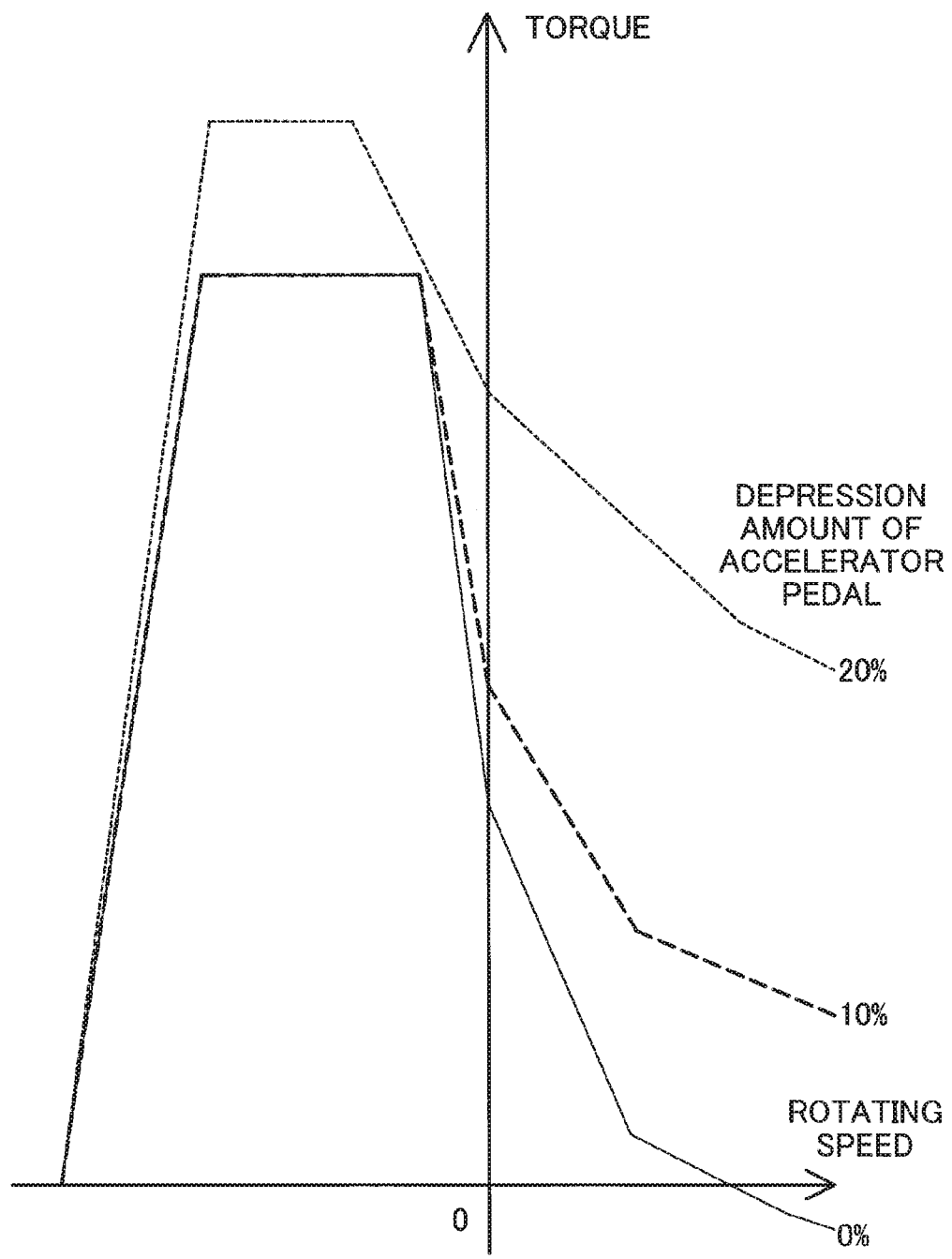
FIG. 3 is a graph illustrating the relation between torque and the rotating speed.

FIG. 3 is a graph illustrating the relation between torque defined for each stepping amount of the accelerator pedal 910 and the rotating speed. Hereinafter, the merely-refereed stepping amount indicates a stepping amount of the accelerator pedal 910. FIG. 3 illustrates the cases with the stepping amounts of 0%, 10%, and 20%. In actually, the relation with 0% to 100% is defined with intervals smaller than 10%.

The merely-referred torque in the embodiment indicates torque generated by the electric drive motor 220. The merely-referred rotating speed in the embodiment indicates the rotating speed of the electric drive motor 220. The control unit 160 stores such relation as a map. The control unit 160 controls the electric drive motor 220 based on the relation through the motor inverter 150.

FIG. 3 extracts and illustrates the case with the rotating speed of around 0 rpm. Actually, also regarding the larger rotating speed, the relation between the torque and the rotating speed is defined. As illustrated in FIG. 3, even when the rotating speed is a negative value, the relation between the rotating speed and the torque is defined. The relation when the rotating speed is a negative value is not applied to backward driving such as in parking but the situations in which a vehicle is retreated when starting on a slope. Even when the rotating speed is a negative value, the torque generates propulsion force in a direction allowing the truck 10 to travel forward as long as the torque value is positive.

The following will describe the slope start. To be more specific, the following will describe the action of the truck 10 when it is stopped on an uphill while a driver steps the brake pedal 920 and then started once the driver stops stepping the brake pedal 920 and steps the accelerator pedal 910.

When the tire is not span, the rotating speed and the vehicle speed are in proportional relation, in which when the rotating speed is zero, the vehicle speed is also zero. Furthermore, when the tire is not span, the torque and the force for propelling a vehicle body are in proportional relation. The following description assumes that the tire is not span.

Figure 4:
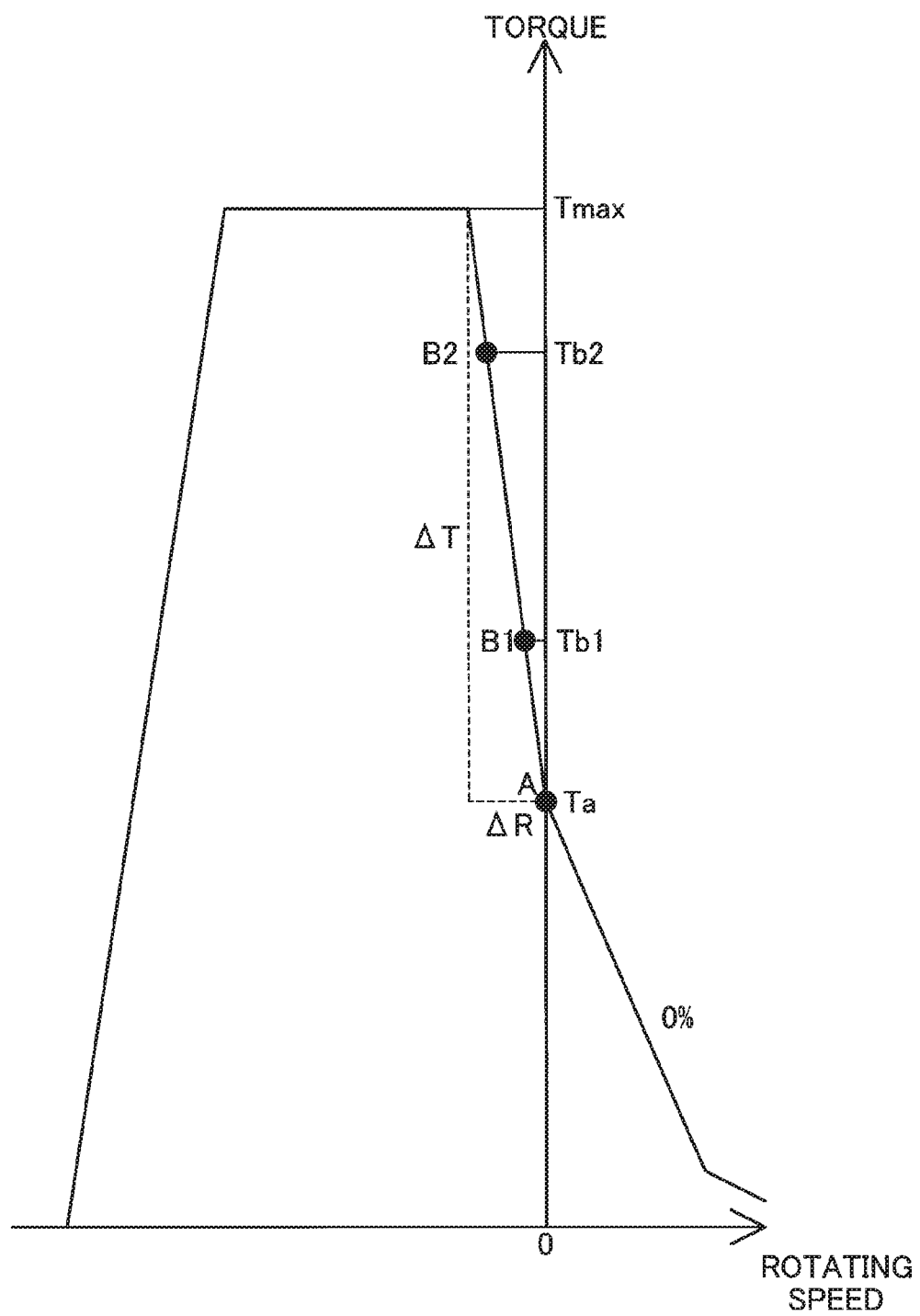
FIG. 4 is a graph illustrating the relation between torque and the rotating speed.

FIG. 4 is a graph illustrating the relation between the torque and the rotating speed when the steeping amount is 0%. When the rotating speed is zero, a value of generated torque is torque Ta. When the rotating speed is reduced from zero, the torque increases linearly at a rate of $\Delta T/\Delta R$ until reaching torque Tmax. That is, the rotating speed and the torque are in proportional relation. Note that $\Delta R$ is regarded as a positive value. The increase of $\Delta R$ indicates the increase of an absolute value of $\Delta R$. The expression that the rotating speed is reduced from zero indicates that the rotating speed is a negative value and an absolute value of the rotating speed is increased.

Figure 5:
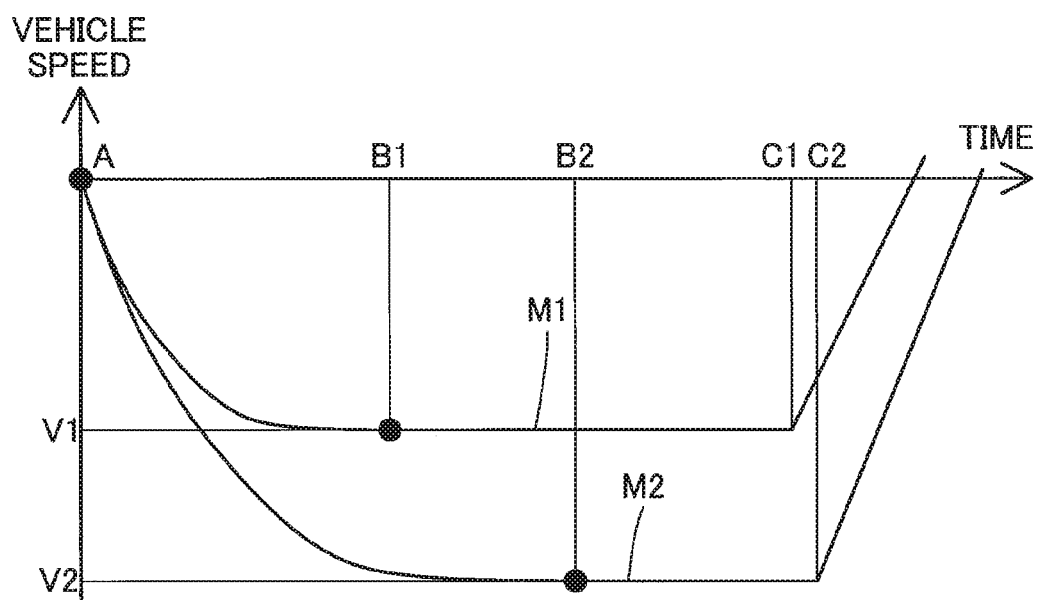
FIG. 5 is a graph illustrating the time change of vehicle speeds in the slope start.

FIG. 5 is a graph illustrating the time change of vehicle speeds in the slope start. FIG. 5 illustrates a case of a vehicle weight M1 and a case of a vehicle weight M2. The vehicle weight M1 is a vehicle weight when the trailer 19 is not loaded with fright. The vehicle weight M2 is a vehicle weight when the trailer 19 is fully loaded with freight, and is several times the vehicle weight M1. Time between time A and time C1 and between the time A and time C2 is time during which any of the accelerator pedal 910 and the brake pedal 920 is not stepped (changing step time).

A point A illustrated in FIG. 4 corresponds to the time A of FIG. 5. The same applies to the points B1, B2. As illustrated in FIG. 4, with the stepping amount of 0%, the torque generated at the time A is referred to as torque Ta, the torque generated at the time B1 is referred to as torque Tb1, and the torque generated at the time B2 is referred to as torque Tb2.

The time at the point A is time at which a driver stops stepping the brake pedal 920. At the time of the point A, the vehicle speed is zero, as illustrated in FIG. 5. At the time of the point A, the stepping amount is 0%, and thus the torque corresponding to the rotating speed of zero is generated, as illustrated in FIG. 4.

In the case of the vehicle weight M1, retreating force F1 acting in a retreating direction on an uphill is calculated by $F1 = M1 \cdot g \cdot \sin \theta 1$ in a simplified manner. The g is gravity acceleration. The $\theta 1$ is an angle corresponding to the gradient of a slope in the case of the vehicle weight M1. Also in the case of the vehicle weight M2, the retreating force F2 is calculated by $F2 = M2 \cdot g \cdot \sin \theta 2$.

If the propulsion force generated by the torque Ta exceeds the retreating force F1, F2, the truck 10 travels forward. However, in the example illustrated in FIG. 5, the propulsion force generated by the torque Ta is smaller than the retreating force F1, F2. Thus, the acceleration in a retreating direction occurs.

When the acceleration in a retreating direction occurs, the rotating speed of the electric drive motor 220 becomes a negative value. As the speed in a retreating direction increases, an absolute value of the rotating speed is increased gradually. Thus, the torque is increased gradually, as illustrated in FIG. 4.

As the torque is increased gradually, the acceleration in a retreating direction is reduced gradually, as illustrated in FIG. 5. Then, in the case of the vehicle weight M1, the propulsion force by the torque Tb1 generated at the time B1 matches the retreating force F1. When the propulsion force matches the retreating force, the acceleration becomes zero. As a result, the retreat becomes uniform motion. To be more specific, the retreating speed becomes constant with a speed V1, as illustrated in FIG. 5.

Also in the case of the vehicle weight M2, the propulsion force by the torque Tb2 generated at the time B2 matches the retreating force F2. As a result, the retreating speed becomes constant with a speed V2.

In the above-described uniform motion, the absolute value of the torque generated by the electric drive motor 220 is equal to the absolute value of the torque generated by the retreating force.

In the case of the vehicle weight M1, the accelerator pedal 910 is stepped at the time C1, generating torque larger than the case in which the stepping amount is 0%. Thus, as illustrated in FIG. 5, forward acceleration is generated, and then the vehicle speed becomes a positive value. Also in the case of the vehicle weight M2, the accelerator pedal 910 is stepped at the time C2, generating forward acceleration. Thereafter, the vehicle speed becomes a positive value.

The flow of signals for achieving the above-described control is organized and described as follows. The resolver 230 measures a rotation angle. The measured rotation angle is input to the control unit 160. The control unit 160 calculates the rotating speed based on the input rotation angle. The control unit 160 refers to a map to determine torque based on the measured rotation angle. The control unit 160 transmits an instruction for achieving the determined torque to the motor inverter 150. The motor inverter 150 allows a current to flow in the electric drive motor 220 in accordance with the instruction.

In the embodiment described above, it is possible to obtain at least the following effects.

In the changing step time, the acceleration in a retreating direction is reduced gradually and becomes uniform motion. Thus, a driver is able to calmly perform stepping change from the brake pedal 920 to the accelerator pedal 910 in the slope start.

The determination of torque during stepping change time does not require a value of the vehicle weight, a value of the gradient, or a value of the vehicle speed. This facilitates the implementation. The main reasons why such an effect is obtained are that the retreating itself is not prevented but allowed and that it is used that the electric drive motor 220, unlike an internal combustion engine, is able to generate a positive value of torque even when the rotating speed is a negative value.

The hunting of torque is suppressed during steeping change time. This is because the increment amount of the torque when the rotating speed is reduced from zero is $\Delta T/\Delta R$. In other words, the value of $\Delta T/\Delta R$ is defined so that the hunting of torque hardly occurs during stepping change time. That is, when $\Delta T/\Delta R$ is excessively large, the hunting of torque occurs during stepping change time, easily causing the situation in which the acceleration does not smoothly become uniform motion. Meanwhile, when $\Delta T/\Delta R$ is excessively small, it takes time until the acceleration becomes uniform motion, which makes a retreating speed excessively high. In the embodiment, the value of $\Delta T/\Delta R$ is defined to be well-balanced.

In addition to the above, the hunting of torque is suppressed because simple proportional control is used. With the use of PI control, PID control, or the like, the hunting easily occurs depending on a control parameter.

The disclosure is not limited to the above-described embodiments and examples, and may be achieved with various configurations without departing from the scope of the disclosure. For example, the technical features in the embodiments and examples corresponding to the technical features of each aspect in the summary of the disclosure may be appropriately replaced or combined in order to solve a part or all of the above-described problems or achieve a part or all of the above-described effects. When the technical features are not explained as necessary in the specification, they may be deleted appropriately. For example, the followings are exemplified.

The truck may not be a type pulling a trailer. For example, it may be a full trailer or a dump truck.

The value of $\Delta T/\Delta R$ may be larger to such a degree that the hunting of torque is generated. In this case, it is possible to reduce a retreating speed.

It is possible to measure a retreating speed and perform feedback control on the electric drive motor so that the variation of measured values is zero.

It is possible to measure retreating acceleration and perform feedback control on the electric drive motor so that the variation of measured values is zero.

The truck may not be a fuel cell vehicle. For example, it may be an electric vehicle charging a secondary battery from a commercial electric power source, or electric power generated by power of an internal combustion engine may be supplied to the electric drive motor.

The truck may be a connected car. The connected car is a vehicle with a communication device, capable of receiving service through communication with cloud.

The control for achieving retreat in uniform motion may not be map control. For example, it may be PI control. The PI control is able to change $\Delta T/\Delta R$, that is, torque increment gradient. To be more specific, the control may be as follows. With addition of a correction term increasing proportional control (P control) when the acceleration at the start of retreat exceeds a reference value, such a correction term is of integration correction (I control). The integration correction term may be kept to be a constant value in one-time slope start. The integration correction term may be gradually reduced during traveling in one-time trip. The integration correction term may be zero as long as the gradient of a slope is within a reference value. The integration correction term may be kept in repeated start when the gradient is larger than a reference value. The integration correction term may be restored to an initial value when the traveling time is long or a trip is finished. This prevents hunting.

What is claimed is:

1. A truck, comprising:
   an electric drive motor for driving; and
   a control unit configured to control the electric drive motor, when a retreat occurs in a slope start on a slope, to generate torque in accordance with a rotating speed of the electric drive motor and without the control unit taking into account a value of gradient of the slope, the generated torque being in an opposite direction from torque acting on the electric drive motor due to the gradient of the slope, and the generated torque having an absolute value same as an absolute value of the torque acting due to the gradient of the slope.

2. The truck in accordance with claim 1, wherein
when the retreat occurs, an absolute value of rotating speed of the electric drive motor increases monotonically as an absolute value of a speed increases by the retreat, and
the control unit increases torque generated by the electric drive motor as the rotating speed is reduced from zero.

3. The truck in accordance with claim 2, wherein the control unit performs control, when the torque is increased as the rotating speed is reduced from zero, so that the torque increment is proportional to variation of the rotating speed.

4. A truck, comprising:
an electric drive motor for driving; and
a control unit configured to control the electric drive motor, when a retreat occurs in a slope start on a slope, to generate propulsion in accordance with a rotating speed of the electric drive motor and without the control unit taking into account a value of gradient of the slope, so that propulsion force generated by the electric drive motor matches retreating force due to the gradient of the slope.

5. The truck in accordance with claim 4, wherein
when the retreat occurs, an absolute value of rotating speed of the electric drive motor increases monotonically as an absolute value of a speed increases by the retreat, and
the control unit increases torque generated by the electric drive motor as the rotating speed is reduced from zero.

6. The truck in accordance with claim 5, wherein the control unit performs control, when the torque is increased as the rotating speed is reduced from zero, so that the torque increment is proportional to variation of the rotating speed.

7. A truck, comprising:
an electric drive motor for driving; and
a control unit configured to control the electric drive motor, when a retreat occurs in a slope start on a slope, to operate the electric drive motor without the control unit taking into account a value of gradient of the slope, so that the retreat becomes uniform motion.

8. The truck in accordance with claim 7, wherein
when the retreat occurs, an absolute value of rotating speed of the electric drive motor increases monotonically as an absolute value of a speed increases by the retreat, and
the control unit increases torque generated by the electric drive motor as the rotating speed is reduced from zero.

9. The truck in accordance with claim 8, wherein the control unit performs control, when the torque is increased as the rotating speed is reduced from zero, so that the torque increment is proportional to variation of the rotating speed.

10. A method of controlling an electric drive motor for driving mounted on a truck, comprising:
detecting occurrence of a retreat in a slope start on a slope; and
controlling the electric drive motor to generate torque in accordance with a rotating speed of the electric drive motor and without taking into account a value of gradient of the slope, the generated torque being in an opposite direction from torque acting on the electric drive motor due to the gradient of the slope, the torque having an absolute value same as an absolute value of the torque acting due to the gradient of the slope.

11. A method of controlling an electric drive motor for driving mounted on a truck, comprising:
detecting occurrence of a retreat in a slope start on a slope; and
controlling the electric drive motor to generate propulsion in accordance with a rotating speed of the electric drive motor and without taking into account a value of gradient of the slope, so that propulsion force generated by the electric drive motor matches retreating force generated due to the gradient of the slope.

12. A method of controlling an electric drive motor for driving mounted on a truck, comprising:
detecting occurrence of a retreat in a slope start on a slope; and
controlling the electric drive motor to operate the electric drive motor without taking into account a value of gradient of the slope, so that the retreat becomes uniform motion.

* * * * *